E. R. RAMSEY & J. H. MEYER.
MACHINE FOR MAKING FLEXIBLE TUBULAR ARMOR.
APPLICATION FILED FEB. 3, 1914.
1,105,836.
Patented Aug. 4, 1914.
4 SHEETS—SHEET 2.
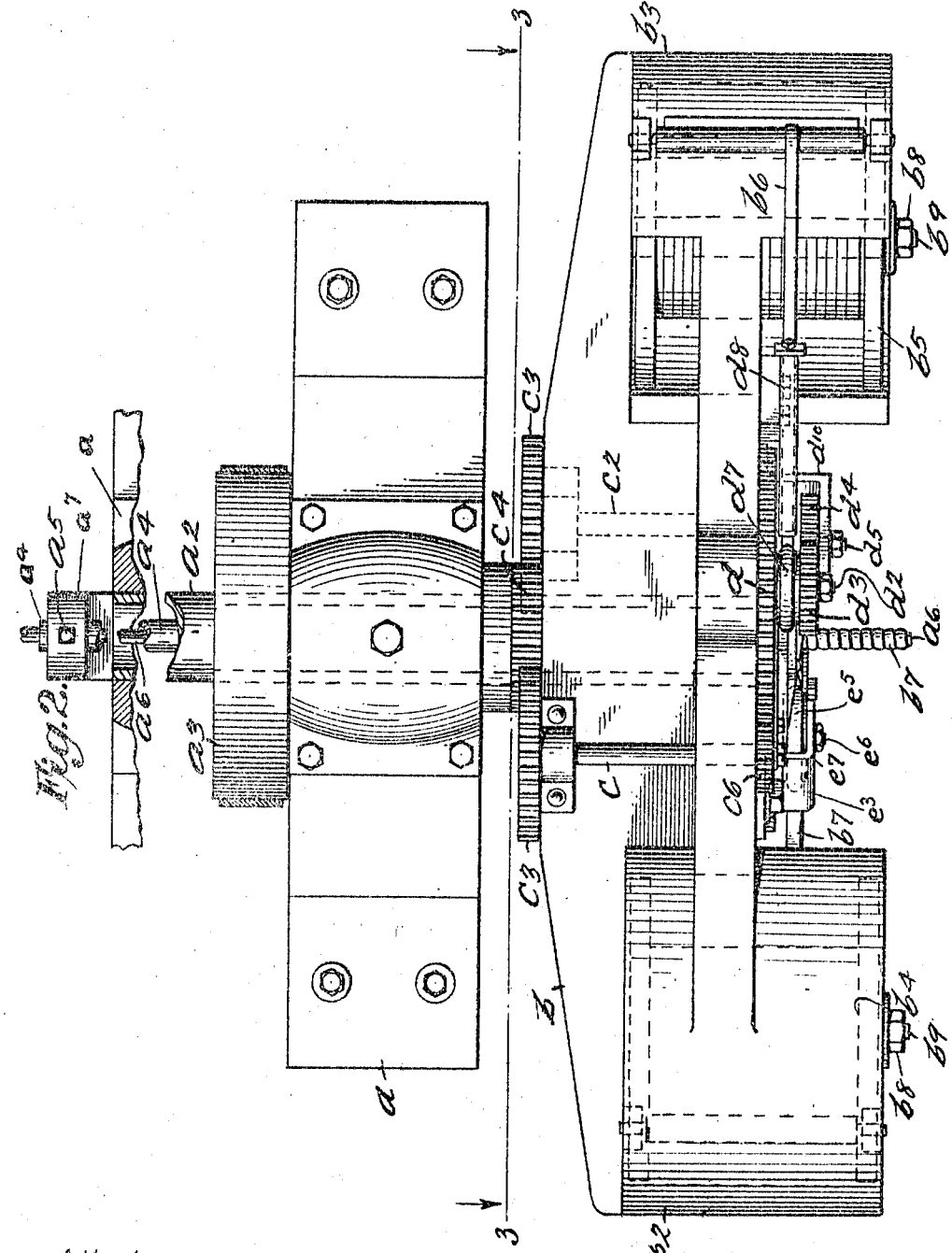
Attest:
Inventors:
Edia R. Ramsey &
John H. Meyer
Atty.

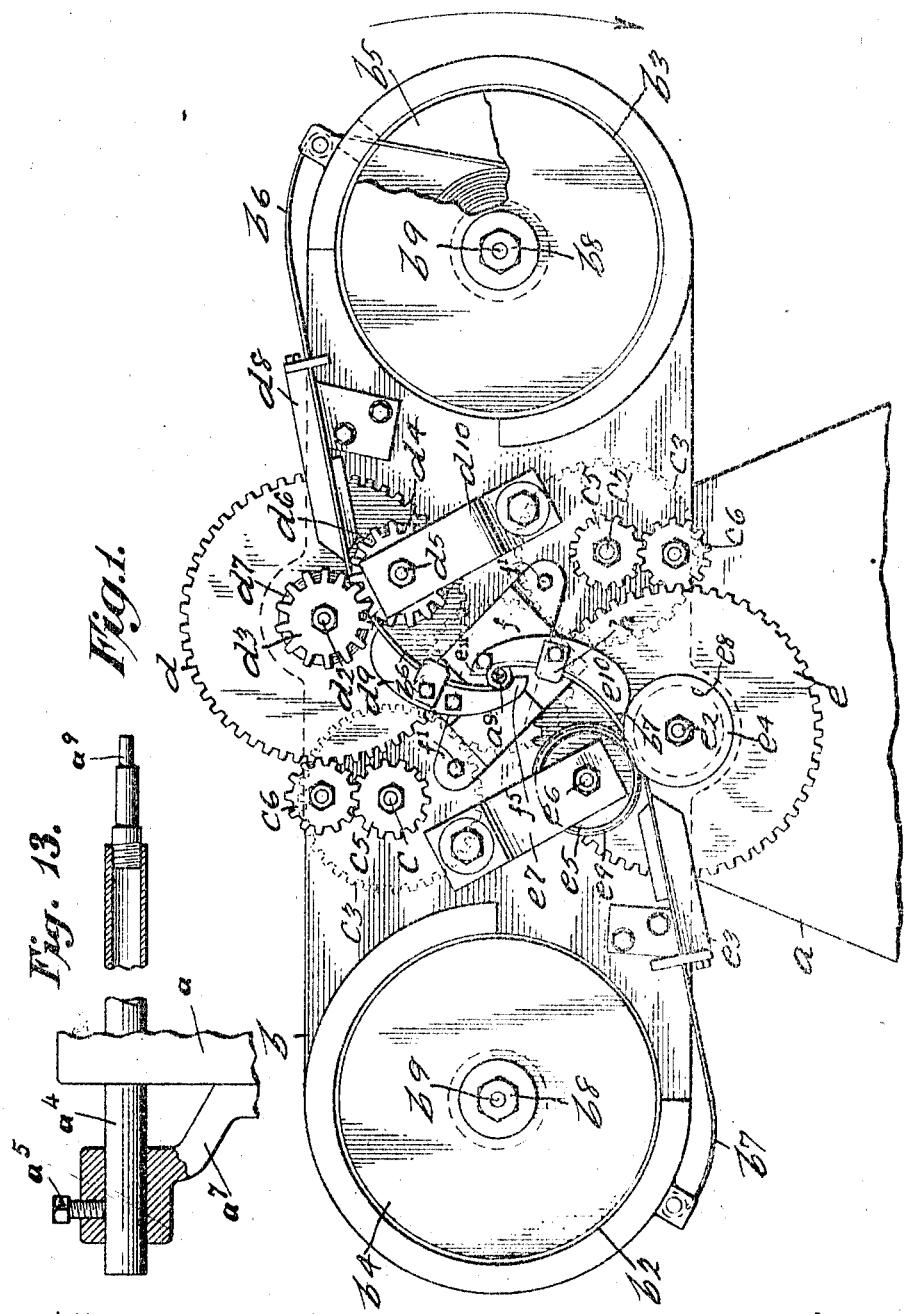

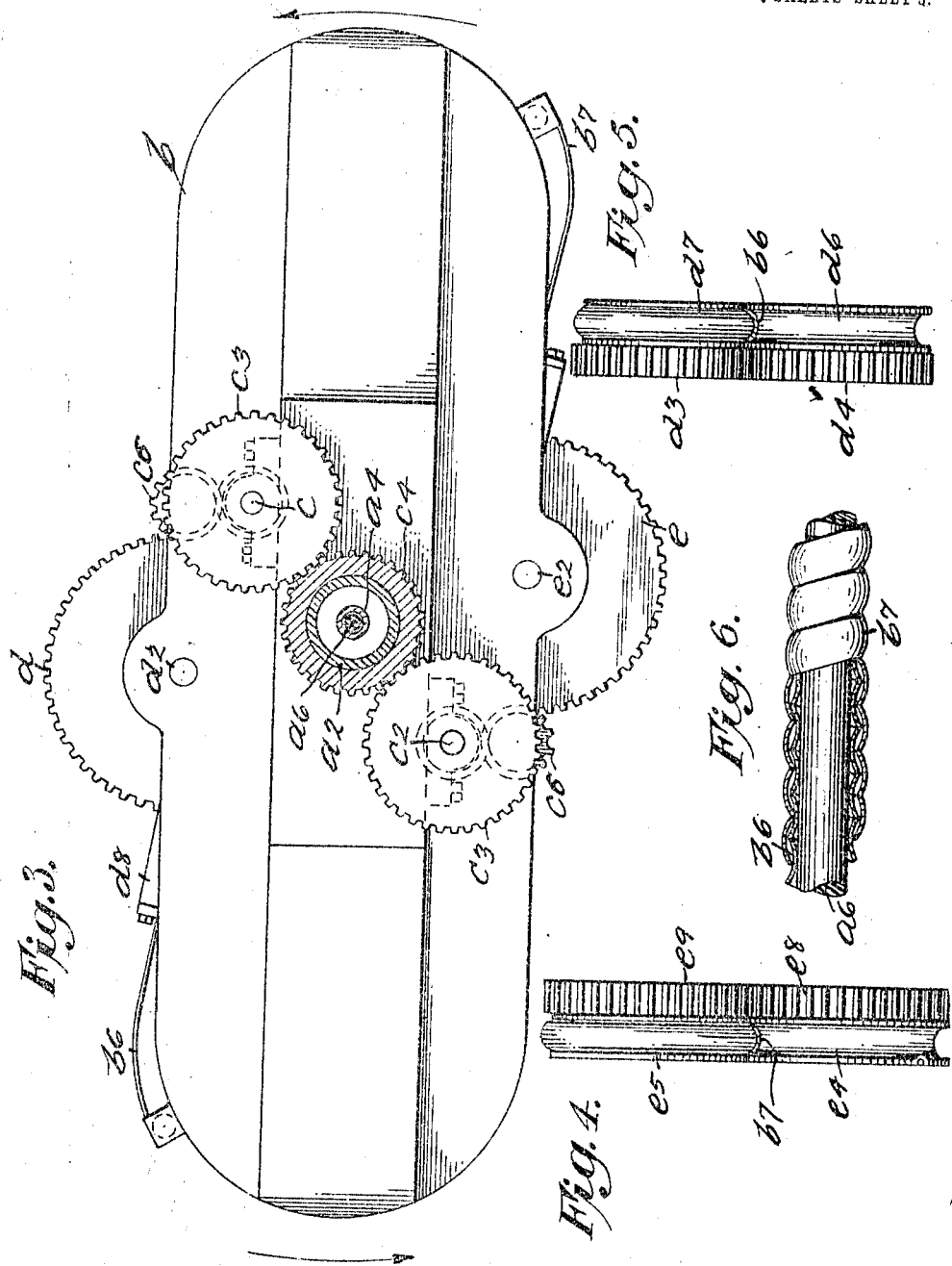

E. R. RAMSEY & J. H. MEYER.
MACHINE FOR MAKING FLEXIBLE TUBULAR ARMOR.
APPLICATION FILED FEB. 3, 1914.
1,105,836.
Patented Aug. 4, 1914.
4 SHEETS—SHEET 4.
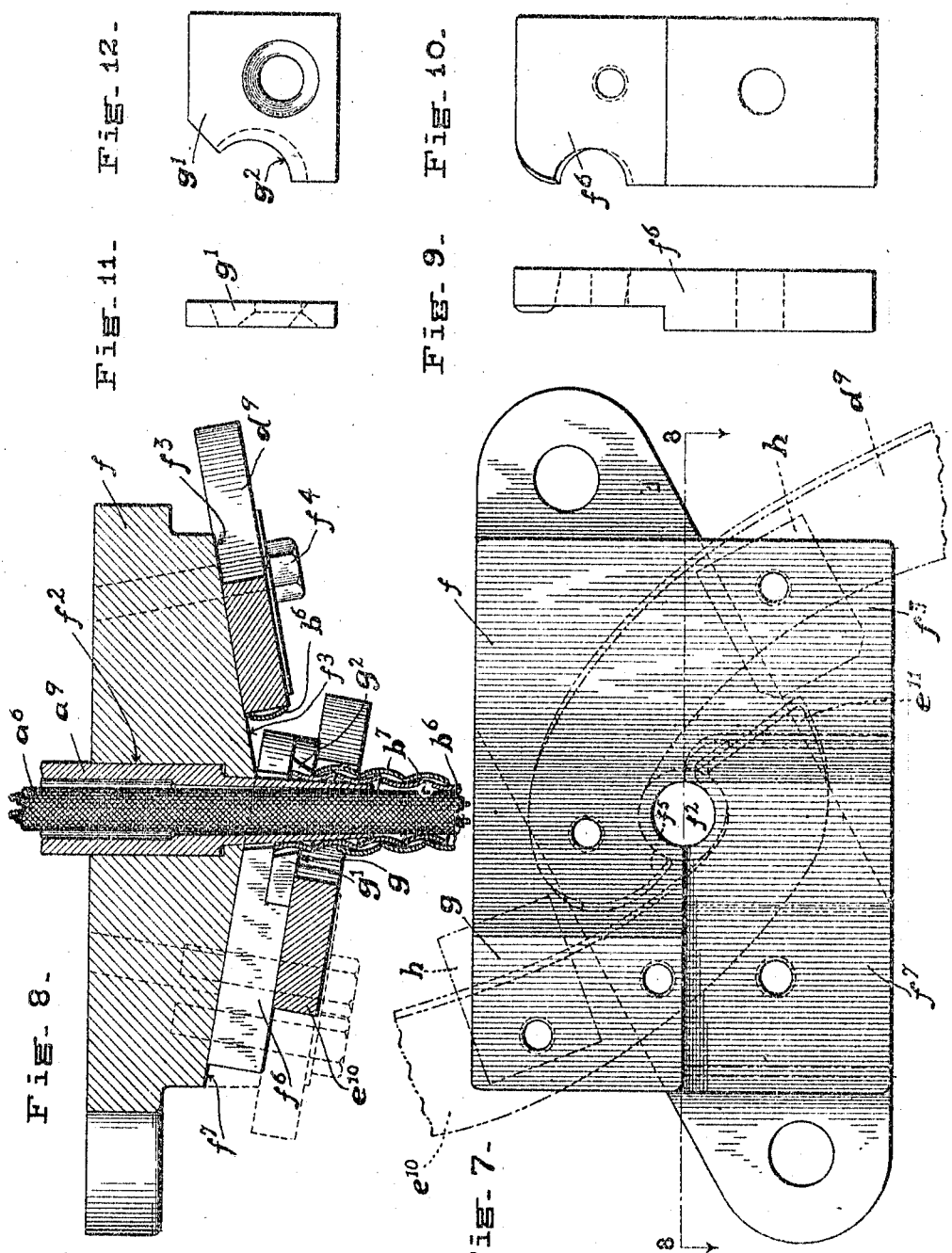
WITNESSES
INVENTORS:
Edia R. Ramsey &
John H. Meyer
BY
ATTORNEY.

UNITED STATES PATENT OFFICE.

EDIA R. RAMSEY AND JOHN H. MEYER, OF PENN YAN, NEW YORK; SAID MEYER ASSIGNOR TO SAID RAMSEY.

MACHINE FOR MAKING FLEXIBLE TUBULAR ARMOR.

1,105,836.  Specification of Letters Patent.  Patented Aug. 4, 1914.

Application filed February 3, 1914. Serial No. 816,282.

*To all whom it may concern:*

Be it known that we, EDIA R. RAMSEY and JOHN H. MEYER, citizens of the United States of America, and residing at Penn Yan, in the county of Yates and State of New York, have invented new and useful Improvements in Machines for Making Flexible Tubular Armor, of which the following is a specification.

Our invention relates particularly to machines for winding or coiling a strip or strips of metal so as to form a tube or to cover a rope, hose or cable.

The main object is to provide a simple, compact, inexpensive machine which can be readily operated economically to form a uniform product.

Another object is to provide a machine in which the product can be made automatically from the ordinary thin, flat strips.

Another object is to facilitate adjustments to compensate for variation in the size and temper of the metallic strips.

Another object is to facilitate repair, substitution and replacement of parts.

The invention in its preferred form briefly considered, consists of a stationary mandrel and a winding head rotating about the axis of said mandrel, carrying two reels of flat strips together with driven rolls for grooving the strips and oppositely disposed inclined curved guides for directing the strips to the mandrel. The rolls are driven so as to supply the strips to the mandrel at just the right linear speed to furnish the necessary tension for uniform winding on the mandrel. The product slips off the end of the mandrel and draws down slightly. By adjusting the mandrel in or out the drawing down may be regulated as desired. Different sizes of product may be made on the same machine by employing the proper gears and mandrel. By using a hollow mandrel, a rope, hose or cable can be armored by simply feeding the proper core through the mandrel so that the armor as it is formed can draw down upon the core. The guides are preferably detachably carried by a fixture plate which is itself detachable readily from the head.

Other details of improvement will be pointed out hereinafter and specified in the claims.

The accompanying drawings illustrate the invention in a concrete and practical form but as this is primarily for illustrative purposes it will be understood that various changes and modifications may be made without departure from the true scope and spirit of the invention.

Figure 1, is a front elevation of the machine, as ready for operation, one of the strip reels being shown partly broken away. Fig. 2, is a plan view, with the tubular supporting shaft and one of the bearings broken away and shown in section. Fig. 3, is a rear view of the coiling head and related parts, taken substantially on the plane of the line 3—3 of Fig. 2. Figs. 4 and 5 are detached detail views of the grooved rolls for the outer and inner strips respectively, these views being taken from the right, looking toward the left in Fig. 1. Fig. 6, is a partly sectional view of a piece of cable armor as formed in the machine. Fig. 7, is a face view of the detached fixture plate, showing in dotted lines the relative positions of the various parts carried thereby. Fig. 8, is a sectional view of the fixture plate and associated parts, this view being taken substantially on the plane of the line 8—8 of Fig. 7. Figs. 9 and 10 are edge and side views respectively of the push-off plate or member which is carried by the fixture plate and which forms a helical continuation of the inclined push-off shoulder for the inner armor strip. Figs. 11 and 12 are edge and side views of the member carried by the push-off plate and which forms a part of the inclined push-off shoulder for the outer armor strip. Fig. 13, is a fragmentary sectional view illustrating the adjustable mounting for the mandrel.

Referring now to the drawings more in detail; $a$, indicates the frame or supporting structure of the machine, provided with suitable bearings in which is journaled the tubular supporting shaft $a^2$. A pulley $a^3$, or other suitable means is provided for rotating this shaft. A brake (not shown) may be also provided if desired as is common in automatic machines.

The mandrel $a^5$ about which the armor strips are wound, is carried by a shaft $a^4$ extending through the tubular supporting shaft and held clamped in its longitudinal adjustment by a clamping screw $a^5$ in the bracket $a^7$, this bracket being carried by the framework. The mandrel and shaft may likewise be in tubular form to allow a core such as a cable $a^6$ to pass therethrough when armoring direct on a cable, etc.

The "winding" or "coiling" head $b$ is carried by the tubular supporting shaft, and is shown provided on opposite sides of the center thereof with housings $b^2$, $b^3$ to receive the spools $b^4$, $b^5$ which carry supplies of thin metal strips $b^6$, $b^7$. These spools may be held against unwinding too readily by suitable means for instance, the retaining nuts $b^8$ on the ends of the spool shafts $b^9$.

The driving of the grooving rolls is effected through the medium of shafts $c$, $c^2$, journaled in the head and extending from the front to the rear side thereof, these shafts carrying gears $c^3$ on their rear ends meshing with a stationary gear $c^4$ fast on the supporting frame and gears $c^5$ on their forward ends meshing with intermediate gears $c^6$ which in turn engage with gears $d$ and $e$ on the driven grooving roll shafts $d^2$ and $e^2$ respectively. Mounted on the grooving roll shaft $d^2$, is a pinion $d^3$ in mesh with a pinion $d^4$ on the second grooving roll shaft $d^5$, this latter shaft carrying the concave member $d^6$ and the first or driven shaft $d^2$, the convex member $d^7$ of a pair of grooving rolls. A guide $d^8$ serves to direct the first or inner armor strip $b^6$ to this pair of grooving rolls and from these rolls the grooved strip is gradually bent and directed toward the mandrel by a curved guide $d^9$. The inner grooved strip is coiled about the mandrel with the groove therein facing outwardly, as indicated in Fig. 8. One of the rolls ($d^6$) of this pair, is shown mounted in a bracket $d^{10}$ which may be made adjustable on the head for the purpose of bringing the rolls into proper operative relation. The second armor strip $b^7$ is directed by the guide $e^3$ to the second set of grooving rolls, consisting of the concave member $e^4$ on the driven grooving roll shaft $e^2$ and the coacting convex member $e^5$ on the shaft $e^6$, this latter roll being mounted in a bracket $e^7$. The two rolls of this pair are positively coupled together by the intermeshing pinions $e^8$ and $e^9$ on the shafts of the respective rolls. The second or outer armor strip issues from this second set of grooving rolls with a longitudinal groove therein which faces in this case toward the inner strip on the mandrel and the outer grooved strip is guided from the rolls to the mandrel by a curved guide $e^{10}$.

The manner in which the grooved strips are positively guided and coiled in overlapped interlocking relation on the mandrel will be more clearly understood from Fig. 8, which shows the fixture plate and its appurtenant parts. This fixture plate $f$, is shown as detachably secured to the rotating head by fastening bolts $f^1$, and is provided with a central passage $f^2$ in line with the axis of rotation and through which the mandrel $a^9$ projects. $f^3$ designates the inclined guiding face for the first or inner armor strip, this face extending as shown, on an outward slant from a point at one side of the passage in the plate to the farther side of such passage. This guiding face thus forms an inclined abutment up which the inner strip travels to the far side of the passage. The strip bears with one edge against the abutment and is guided and gradually bent toward the passage by the curved guide plate $d^9$, which, as shown, is secured flat against the inclined face by bolts $f^4$ and extends from a point adjacent the grooving rolls at the base of the incline, up to and partially around the passage, terminating in a hook-shaped end $f^5$, which by partially encircling the passage, serves to positively hold the first convolution and assist in laying it in proper coiled form on the mandrel. From the guiding face $f^3$, the inner strip passes onto the face of a member $f^6$ seated in a recess $f^7$ in the fixture plate and disposed on an angle to form a helical continuation of the inclined bearing face $f^3$. This member preferably is made of hardened steel so as to form a push-off shoulder for the first or inner strip. The guide $e^{10}$ for the second or outer strip is curved similarly to the guide for the first strip so as to bend the second strip while guiding it to the mandrel, and this guide $e^{10}$, like the first guide, also terminates in a hook-shaped projection $e^{11}$ partially encircling the mandrel to thereby positively hold the coil last formed in the outer strip in proper shape. An inclined guide face $g$ for the second or outer armor strip may be arranged on the fixture plate at the opposite side of the passage from the first inclined abutment face and extend from said side over to the farther side of the passage. A guide member $g^1$, also of hardened steel may be secured to the push-off plate $f^6$, forming a continuation of guide face $g$. This member $g^1$ is, as shown in Fig. 8, disposed parallel to and spaced in front of the member $f^6$ a distance approximately equal to one-half the width of the inner strip, by reason of which it serves to lap the second or outer strip about one-half the width over the inner strip. This final push-off plate $g^1$ is spaced away from the mandrel as indicated at $g^2$ to thereby provide a curved annular wall surrounding the mandrel serving to confine the first convolution of the inner strip in true coiled form. The manner in which the inclined shoulder for the second strip is off-set forwardly from the shoulder for the first strip also clearly appears in Fig. 8. By this arrangement the outer convex strip is laid in overlapping order over the convolutions of the inner concave strip and thereby serves to securely interlock and tie the whole together in a unitary structure. In some cases it has been found that the plate $g^1$ may be omitted entirely. Suitable guards $h$ may be provided for holding the strips in engagement with the inclined guiding faces. When feeding in the strips preparatory to starting the machine, these guards, which as shown, may be mounted on the bolts $f^4$, may be swung to one side out of the way. Also if found necessary the guide plates may be loosened or entirely removed so as not to interfere with the strips being led about the mandrel. The open construction and ready accessibility of the fixture plate and associated parts make the preliminary feeding in of the strips a very simple matter.

The speed of the grooving rolls is governed by the gearing which drives the rolls and the ratio of this gearing is preferably such that the armor strips will be grooved and fed forwardly by these rolls at a rate slightly less than the rate of the bodily movement of these rolls about the surface of the mandrel so as to feed the exact amount of stock required for the product. The speed of these rolls being uniformly proportional to the rotations of the head insures a uniform feed irrespective of the rate of rotation of the head or the weight of stock in the reels. This gives a uniform tension to the coiled strips on the mandrel and causes the coils as they slide off the mandrel to draw down to the same uniform size.

The operation is as follows:—As the winding head rotates about the axis of the mandrel, the grooving rolls rotate, positively drawing the strips from the reels at a uniform rate, grooving the strips and advancing the grooved strips toward the mandrel. The tension devices at the reels are adjusted lightly to prevent the strips unwinding too freely from the reels. After leaving the grooving rolls, the strips pass up the oppositely inclined abutment faces on their way to the mandrel, during which time the coiling action is begun by gradually bending the strips toward the mandrel by means of the curved guide plates. The inner concave armor strip passes up the inclined guide face $f^3$ of the fixture plate into engagement with the mandrel and on around onto the inclined push-off plate $f^6$ which forms a helical continuation of the guide face. The hook-shaped end $f^5$ of the curved guide plate $d^2$ holds the portion of inner strip bearing on the inclined face $f^3$ in proper coiled shape and the curved retaining wall $g^2$ of the push-off $g^1$ holds the final coiled portion of the inner strip which bears upon the first push-off plate, in true coiled form. The outer convex armor strip travels up the inclined shoulder of the fixture plate and the second push-off plate $g^1$ (if used) into overlapping engagement over two adjoining convolutions of the inner strip and is held in proper coiled engagement with the two inner convolutions by the hook-shaped end $e^{11}$ of the second curved guide plate. In the continued rotation of the winding head, the coiled and completed armor slips forward off the mandrel and the coils draw down to a uniform reduced diameter, this drawing down being occasioned by the action of the grooving rolls in feeding the strips at a lesser linear rate than the bodily rotary movement of the strips about the mandrel. The effect of these driven rolls feeding less than enough strip to encircle the mandrel for each revolution of the rolls about the mandrel is to tension the strips and to cause the coils sliding off the mandrel to rotate slightly as they leave the mandrel and thus to coil closer into a more compact structure of uniformly reduced diameter.

As the tension and other characteristics will vary when operating with strips of different thickness, flexibility, etc., it will be necessary at times to change the rate of feed of the strips and to alter the effective length of the mandrel. The change of feed is accomplished by changing the ratio of gearing, which may readily be done by simply substituting different pinions and idlers $e^5$, $e^6$ or by using grooving rolls of different diameter. The adjustment of the mandrel with respect to the push-off shoulders is readily accomplished by loosening the clamping screw and shifting the mandrel shaft longitudinally until the proper length of mandrel is exposed beyond the coiling guides so as to secure the exact diameter of product required.

This invention makes possible the forming of tubular armor in any size desired in a single continuous and uninterrupted operation and the forming of the armor either as a hollow tube or applying it direct to a cable or other core.

Obviously the product may be wound up on a suitable reel with guides, take-ups, etc., as is customary in the winding and coiling art.

What we claim is:—

1. In a machine for making flexible armor from metal strips, the combination with a mandrel for supporting the strips thereon, of driven rolls for grooving the strips longitudinally, means for rotating the said grooving rolls bodily about the axis of the mandrel to thereby wrap the strips shaped by the grooving rolls in coiled interlocking engagement upon the mandrel and an abutment against which the grooved strip bears whereby to force the armor as it is coiled forward off the mandrel.

2. In a machine for making flexible armor from thin metal strips, the combination with a mandrel on which the strips are coiled, of a winding head rotating about the axis of said mandrel and provided with an inclined shoulder for pushing the completed armor off the mandrel, means for supporting a supply of the thin armor strips on the winding head, grooving rolls on the winding head for longitudinally grooving the strips into interlocking shape and means for directing the grooved strips from the grooving rolls to the mandrel in overlapping relation.

3. In a machine for making flexible armor from metal strips, the combination of a relatively stationary mandrel, grooving rolls for transversely curving the strips, means for rotating the grooving rolls bodily about the mandrel to thereby coil the grooved strips in interlocked engagement upon the mandrel and an abutment carried by the said rotating means and against which the grooved strip bears to thereby force the completed armor forward off the mandrel.

4. In a machine for making flexible armor from metal strips, the combination of a rotating coiling head, a fixture plate carried by said head, a centrally disposed mandrel projecting from the face of the fixture plate, said fixture plate having an inclined shoulder extending on an outward slant from a point at one side of the mandrel to the farther side of the mandrel, grooving rolls carried by the rotating coiling head and located adjacent the base of the inclined shoulder and a guide on the inclined shoulder directing the grooved strip issuing from the grooving rolls up said inclined shoulder into engagement with the mandrel at the far side thereof.

5. In a machine for making flexible armor from the metal strips, the combination of a rotating coiling head, a fixture plate carried by said head, a centrally disposed mandrel projecting from the face of the fixture plate, oppositely inclined shoulders carried by the fixture plate at opposite sides of the mandrel, each of said shoulders extending from its lowest point at one side of the mandrel to the farther side of the mandrel and one of the said shoulders being off-set forwardly from the plane of the other shoulder a distance equal to approximately half the width of the strips, grooving rolls carried by the rotating head adjacent the bases of the inclined shoulders and guides each directing one of the grooved strips issuing from the grooving rolls up one of the inclined shoulders and into engagement with the mandrel at the far side thereof to thereby coil the grooved strips in overlapping interlocked engagement upon the mandrel.

6. In a machine for making flexible armor from metal strips, the combination with a mandrel upon which the strips are coiled, of a coiling head rotating about the axis of the mandrel, a fixture plate carried by said head from which the mandrel projects, oppositely inclined bearing faces on said fixture plate forming abutments against which the edges of the strips passing to the mandrel bear and off-set one in advance of the other to thereby lap one of the strips over the other and curved guides mounted on said bearing faces provided with hook-shaped ends partly encircling the mandrel surface to thereby hold the coiled strips in engagement with the mandrel.

7. In a machine for making flexible armor, a rotating head, strip-carrying reels carried thereby on opposite sides of the axis of said head, a fixture plate having oppositely inclined strip-guiding faces and an inclined shoulder for forcing off the inner strip, a curved guide plate secured against the face of said fixture plate for directing the inner strip to said shoulder and another curved guide plate for directing the outer strip so as to cause it to overlap the edges of the inner strip.

8. In a machine for making flexible armor, the combination of a rotating coiling head, a fixture plate carried thereby, provided with a centrally disposed passage, an inclined shoulder on said plate extending on an outward slant from a point at one side of the passage to the farther side of the passage, a guide for directing one of the armor strips up the said inclined shoulder to the far side of the passage, a second inclined shoulder on the opposite side of the fixture plate from the first inclined shoulder, extending outward on a slant to the farther side of the passage and off-set forwardly from the plane of the first shoulder and a guide for directing a second armor strip up the second inclined shoulder to the far side of the passage.

9. In a machine for making flexible armor, the combination of a rotating coiling head provided with a central passage, an inclined shoulder on said head extending on an outward slant from a point at one side of the passage to the farther side of said passage, grooving rolls mounted on the head adjacent the base of the inclined shoulder, a guide mounted on said inclined shoulder arranged to direct the grooved strip issuing from the grooving rolls up said inclined shoulder to the farther side of the passage, a second inclined shoulder on the head at the side of the passage opposite the first shoulder and extending from said side to the far side of the passage, grooving rolls on the head adjacent the base of said second inclined shoulder and a guide on said shoulder for directing the grooved strip issuing from the second grooving rolls up said second inclined shoulder to the farther side of the passage.

10. In a machine for making cable armor, the combination of a rotating coiling head provided with a central passage, an inclined shoulder extending on an outward slant from a point at one side of the passage to the farther side of said passage, an oppositely inclined shoulder disposed on the opposite side of the passage from the first shoulder and off-set forwardly therefrom, said second inclined shoulder partially surrounding and spaced apart from the passage to receive and guide an armor strip bearing against the first inclined shoulder and an inclined shoulder disposed behind the surrounding portion of the second shoulder and forming a helical continuation of the first inclined shoulder whereby in the rotation of the coiling head to push forward the coil of strip guided by the surrounding portion of the second inclined shoulder.

11. In a machine for making cable armor, the combination of a rotating coiling head provided with a central passage, an inclined shoulder extending from a point at one side of the passage up to the far side of said passage, a member located at said far side of the passage and disposed on an incline opposite that of the shoulder to thereby form a helical continuation of the inclined shoulder, and a second inclined shoulder off-set from and disposed in parallel relation to the helical continuation of the first shoulder, said second inclined shoulder partially surrounding and spaced apart from the passage substantially the thickness of the armor strips, to thereby receive and guide the strip which bears upon the helical continuation aforesaid.

12. In a machine for making cable armor, the combination of a mandrel, a coiling head rotating about the axis of the mandrel, an inclined shoulder partly surrounding the mandrel, a guide for directing an inside armor strip on said inclined shoulder, a second inclined shoulder in front of the first shoulder provided with a curved guiding wall spaced apart from the mandrel to receive and hold the inner strip in engagement with the mandrel surface and said second inclined shoulder being off-set forwardly from the first shoulder substantially half the width of the strip to thereby lay an outside armor strip in overlapped relation over the inner strip.

13. In a machine for making flexible armor, the combination of a mandrel, a coiling head rotating about the axis of said mandrel, grooving rolls mounted on the coiling head at opposite sides of the mandrel axis and curved guides carried by the head extending on a gradual curve from the grooving rolls to the mandrel and terminating in hook-shaped ends partly surrounding the mandrel whereby to gradually bend the grooved strips on their way to the mandrel and to finally hold the strips in coiled form as said strips are wrapped about the mandrel.

14. The combination in a machine of the character described, of a tubular supporting shaft, a coiling head on one end of said shaft, a fixture plate on said coiling head provided with a passage in line with the axis of the tubular shaft, a hollow relatively stationary mandrel shaft extending through the tubular supporting shaft and longitudinally adjustable with respect to the fixture plate, a mandrel carried by the mandrel shaft and projecting through the passage in the fixture plate, inclined push-off shoulders carried by the fixture plate and guides for directing the armor strips to the mandrel.

15. In a machine for making flexible armor, the combination of a mandrel, a coiling head rotating about the axis of said mandrel, means supporting a supply of armor strip on said coiling head, means guiding the armor strip into engagement with the mandrel, means forcing the coiled strips forward off the mandrel and means on said coiling head for positively and uniformly advancing the armor strip from the strip supply to the mandrel at a slower linear movement than the rotary movement of the strip supply about the mandrel, whereby to tension the coils on the mandrel and cause the coiled armor leaving the mandrel to draw down to a uniform reduced diameter.

16. In a flexible armor machine, the combination of a mandrel, a coiling head rotating about the axis of said mandrel, grooving rolls mounted on the coiling head, a fixture plate detachably mounted on the coiling head and provided with a central passage through which the mandrel projects, an inclined push-off shoulder on the fixture plate and guides directing the grooved strips from the grooving rolls to the mandrel carried by the fixture plate and detachable therewith.

17. In a machine of the character set forth the combination of a rotating head, means for supporting supplies of armor strips on said head, a fixture plate carried by the head, and a push-off plate mounted on the fixture plate provided with an inclined shoulder for an inner armor strip and with a push-off shoulder for an outer strip disposed in front of and parallel to the first shoulder and having a curved retaining wall inclosing the coiled portion of the inner strip bearing on the first inclined shoulder.

18. In a machine for making flexible armor, a rotating winding head, a detachable fixture plate carried thereby and having a central passage, a curved guide plate detachably carried by the face of said fixture plate and a movable guard extending beyond the inner edge of said guide plate.

EDIA R. RAMSEY.
JOHN H. MEYER.

Witnesses:
 JEROME O'KEEFE,
 MARY R. RAMSEY.